United States Patent [19]

Maron

[11] Patent Number: 4,705,479
[45] Date of Patent: Nov. 10, 1987

[54] PROCESS OF TEACHING

[76] Inventor: Melvin J. Maron, 3100 Mylanta Pl., Louisville, Ky. 40220

[21] Appl. No.: 844,800

[22] Filed: Mar. 27, 1986

Related U.S. Application Data

[63] Continuation-in-part of Ser. No. 629,241, Jul. 9, 1984, abandoned.

[51] Int. Cl.$^4$ .............................................. G09B 5/06
[52] U.S. Cl. ................................... 434/335; 434/353; 434/362
[58] Field of Search ............... 434/323, 335, 350, 353, 434/362

[56] References Cited

U.S. PATENT DOCUMENTS 3,299,254  1/1967  Dobbins et al. ...................... 434/353

Primary Examiner—Leo P. Picard
Attorney, Agent, or Firm—Edward M. Steutermann

[57] ABSTRACT

A system for using a computer to record and grade answers to problems that have numerical answers, where problem statements have alphanumeric parameters that are replaced by digits taken from an identification code. Students are asked to solve the same problem statements with either the same or distinct identification codes; in the latter case, each must perform a different calculation to get the correct answer. Each student is provided with a transportable memory means such as a floppy diskette which is specially programmed to prompt for answers and record them in a computer-readable form. Grading then consists of using said memory means as input to a computer program that reads the currently recorded answers, determines which are correct, informs the student of the results, and records the results on a system file which provides current information for the instructor but is inaccessible to the students. Incorrect answers can be reworked and resubmitted as needed during a time period specified by the instructor.

12 Claims, 4 Drawing Figures

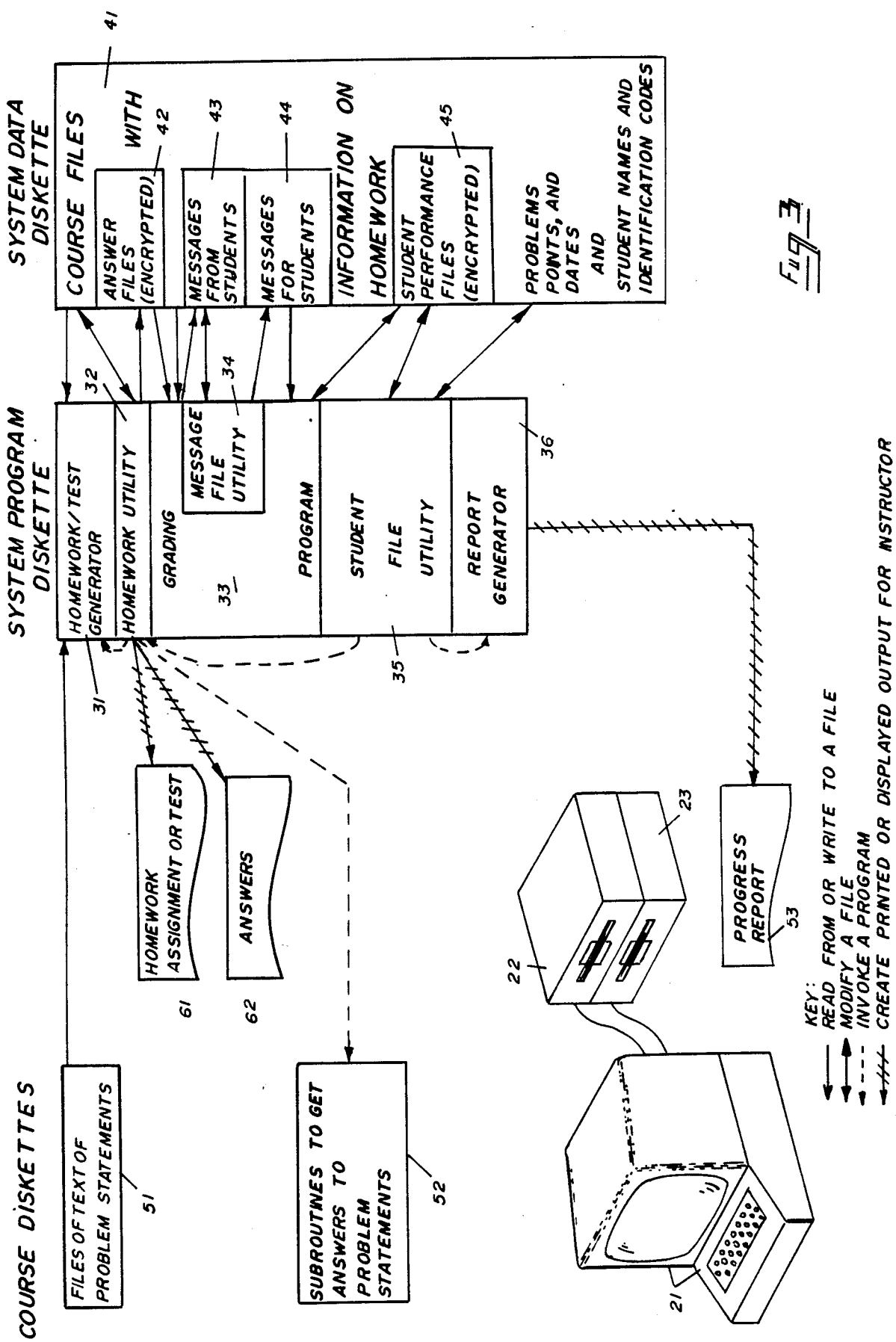

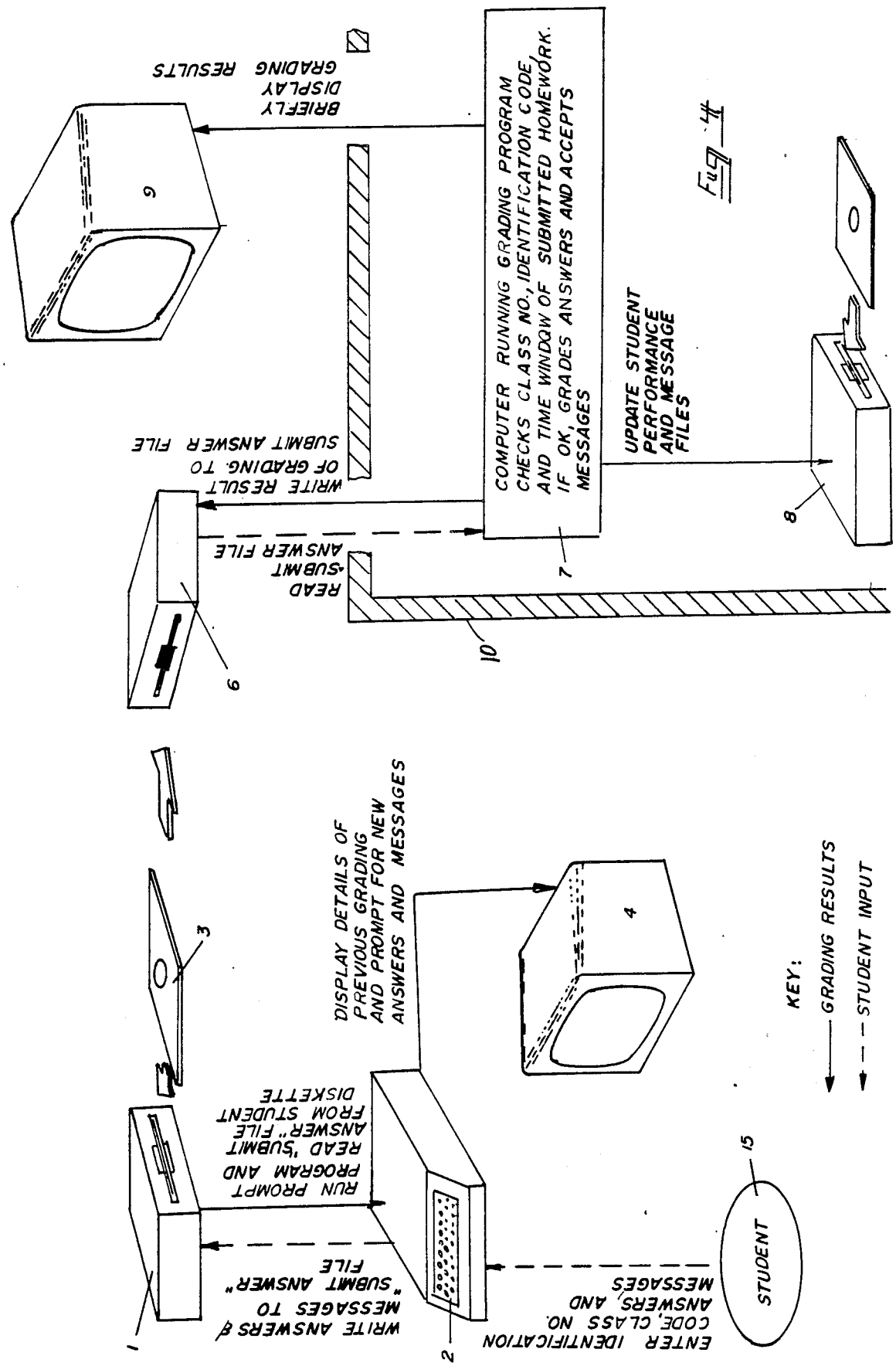

PROCESS OF TEACHING

BACKGROUND OF THE INVENTION

This application is a continuation-in-part of my copending Ser. No. 629,241, filed 7/9/84 now abandoned.

The present invention relates to educational systems utilizing computer aided grading of problem statements and more particularly to a process and apparatus for an electronic grading and teaching aid and more particularly to a system whereby all students are assigned the same problems which require a numerical computation for their solution. The problem statements are given in terms of parameters, and the numbers that a particular student substitutes for these parameters are the digits of an assigned numerical identification code which the student uses for all problems. Students work these parameter-selectable problems with the appropriate parameter values as they would any other such assigned problems (i.e., not necessarily at a computer). If the assigned identification codes are individualized, then correct answers will vary from student to student. Each student is provided with a transportable memory means (e.g., a floppy diskette or optically scannable answer sheet) which is specially prepared to accept and store the answers. Answers to be graded, as well as messages for the instructor, are put on this memory means. Grading of the stored answers consists of inserting this memory means into an appropriate receptacle (e.g., disk drive or optical scanner) that is controlled by a computer program which: accepts the answers and messages, reports which answers, if any, are correct and perhaps indications of why certain others are not and messages from the instructor to the student, and stores the results on a system file which is accessible only to the instructor. This procedure can be used for either homework or tests and can be repeated, if necessary, to allow the student to solve practice problems or homework problems at his own pace and to get the answers graded rapidly, accurately, and on demand.

Prior art arrangements are known for various types of student teaching apparatus. U.S. Pat. No. 2,793,446 Childs, relates to a scoring system for classroom or group use and where the students are assembled at terminals in a classroom, where the answers are graded when the answers are inserted into an electronic device which records whether the answers are correct or not. In this reference, all students work the same problem at the same time. An input device is required for each student since the system has no means for differentiating between students based on input information. Further, the problems are graded by cumulative voltages. There is no means for assessment of the source of any error occurring in the problem solving procedure or for storing or recording student achievement.

U.S. Pat. No. 3,999,307 Tsuda, relates to an instructional device such as a special purpose computer where the same teaching materials are displayed to each student and where each student has a keyboard to make a response to the information. The device is not a grading apparatus but rather is a teaching apparatus commonly termed "computer aided instruction" where all of the work is done at the terminal provided to the student. Randomness is provided by a random number generator within the computer, not by code numbers assigned to each student. A control circuit is provided where the circuit decodes, in sequence, the orders supplied as a program and provides the student with information and reads the response from the student to determine whether the answers are correct or not and then determines the program to be executed in the next sequence. The system is preset to follow a selected sequence in response to the answers received from the student and clearly does not provide the student freedom of choice in answering questions or in resubmitting answers to questions as in the present invention. Further, the device is incapable of accepting answers in differing format. For example, accepting 1.333, 0.1333E+1 and $1\frac{1}{3}$ or 4/3 as equally correct.

Finally, U.S. Pat. No. 3,500,559 Jones, et.al., relates to a system for recording and correlating signals from student response stations where the answers can be required in lock-step or non-lock-step operation. While the system permits the solution of problems individually at each response station and allows the student to answer questions in an order which he selects, the work must be done at the station. Further, while a student identification code can be entered from each station, the required calculation is not affected by the code. Further, all answers must be entered from the specific station and must be recorded immediately on a recording device. While the system includes a computer, nowhere does the reference relate to a system where the student, for the sake of implementing grading, solves the problem consisting of a problem statement modified by his own individual identification code and where the correct answer to his particular situation depends upon the correct solution of a problem utilizing digits of his personal individual identification code. In the reference, the computer provides for the students to answer problems from different problem sets—not the use of modifications of the same problem statement for each individual student. Answers are entered by means of individual switch operation. Answers are then graded for those stations having a response to the questions in an accumulator where the answers are identified coming from particular station—not from a particular student.

In each prior disclosure the procedure provided requires special equipment or specially adapted equipment and does not allow the use of readily available commercial equipment as does the present invention.

Further, none of the references utilize inexpensive individual student memory devices each capable of storing responses for several courses, that can all access more expensive common equipment (e.g. computers, disk drives). Instead, each of the references requires an entire dedicated work station for each student.

The prior art arrangements can not accept decimals or fractions as answers. Instead, they can only accept integer answers and even then the answers must be in the same format as the comparative answers.

Moreover, the references provide methods where groups of students work with either identical problems or completely different, randomly provided problems. No prior art device is known which provides means for individual development of responses to a single set of problem statements based on a code assigned to each student and then individualized grading of assigned problems wherein the student is free to resubmit the responses to the problems at his leisure to a device which is unattended in a way that is logistically efficient and maintains the security of the system files.

Finally no prior arrangement allows messages to be exchanged between the student and instructor at the time of grading.

SUMMARY OF THE INVENTION

Briefly, in accordance with a preferred embodiment of the present invention described hereinafter, an improved system is provided for permitting a group of students to be assigned the same problem statements but with differences in response in accordance with individual numerical identification codes assigned to each student so that a different set of correct anwers is required of each student. The student can work the problems and get the answers graded several times without the need for the instructor's attention; however, messages can be passed between the student and the instructor.

The computer gradable, parameter-selectable problems used to assign homework can also be used to create computer-generated exams or quizzes as well as computerized drill or practice sets, in any course for which problem statements have numerical answers which result from a computation (e.g. algebra, calculus, physics, electronics, etc.). In one example, instructors in a course would be provided with a problem bank consisting of several hundred computer-gradable, parameter-selectable problems. One such problem bank can be used in several different applications, depending primarily on the mechanism used to substitute values for the parameters. Some available strategies within the scope of the present invention are:

(a) Exam/Quizzes

The instructor selects the problem statements and chooses the parameters and point values of all answers. An exam/quiz with these parameter values is generated, duplicated, and given to all students away from the computer, and the correct answers are given to, the instructor;

(b) Drill/Practice

Problems appropriate for a particular student can be selected by the instructor, student, or computer, and parameters can be chosen by the student or the computer. Answers are submitted to the computer which may give the student correct answers if necessary; and (c) Homework Problem statements and point values are chosen by the instructor, and student identification codes are used to provide the parameters. Answers are submitted to the computer which keeps detailed records of individual student performance which can be reported to the instructor.

While computer-based schemes for generating exams, quizzes or drill or practice sets do currently exist, no known prior computer-based scheme has the capability of generating problems for several students and allowing individualized electronic homework grading in a comprehensive and efficient way that can be implemented using as little as one microcomputer, one monitor, two disk drives, and a switch such as a button or joystick as hereinafter described.

The procedure of the present invention also allows the student to work problems at his own pace and at a location selected by him apart from the grading system. Further, if students are given distinct identification codes, then all students can be assigned the same problem statements but each will get a different answer, thereby precluding copying.

Each student is provided with a transportable memory means (e.g., a floppy diskette) which is programmed to accept answers and record them in a computer readable form. Grading consists of using said memory means as input to a computer program that reads the currently recorded answers, determines which are correct, informs the student of the results, and records the results on a system file accessible only to the instructor. At this time, the computer program can also update the student memory means, offer hints regarding wrong answers, and exchange messages between the student and instructor. Incorrect answers can be resubmitted for grading at a later time.

It will be recognized that the present invention provides means to assign problems to students where the students may be allowed to work together but with no reward for copying. Further, reports of student progress are easily generated from the system files, and homework is graded promptly and accurately at a pace that is determined by the work rate of the student. The present invention further recognizes that instructors currently do not normally have the time or support necessary to monitor the progress of students learning at their own pace.

The present invention can provide a diskette grading system in which a single diskette can be used to store submitted answers to problems for one or several of a student's courses, and the actual grading of these submitted answers occurs when this diskette is inserted in a designated grading disk drive which is set up to grade assignments in the student's course(s) and possibly other courses as well.

In accordance with the present invention, the separation of actual grading from the relatively slow process of recording answers in a computer readable form accomplishes two things: First it minimizes the time needed to grade any one student's homework and hence reduces the possiblility of long queues if a single grading receptacle (e.g., a floppy disk drive) is used. Second, grading answers that are read from a memory means rather than, say, a keyboard denies the student direct access to the system data files and thus ensures their security.

One embodiment in accordance with the present invention is shown in the accompanying figures; but it will be understood that other arrangements also within the scope of the present invention will occur to those skilled in the art upon reading the disclosure set forth hereinafter.

BRIEF DESCRIPTION OF THE DRAWINGS

FIG. 3 is a flow chart of one example of one arrangement within the scope of the present invention for preparing and maintaining system files; and FIG. 4 is a flow chart showing information flow during the submission and grading of answers for one homework assignment.

DETAILED DESCRIPTION OF THE DRAWINGS

Figure 1:
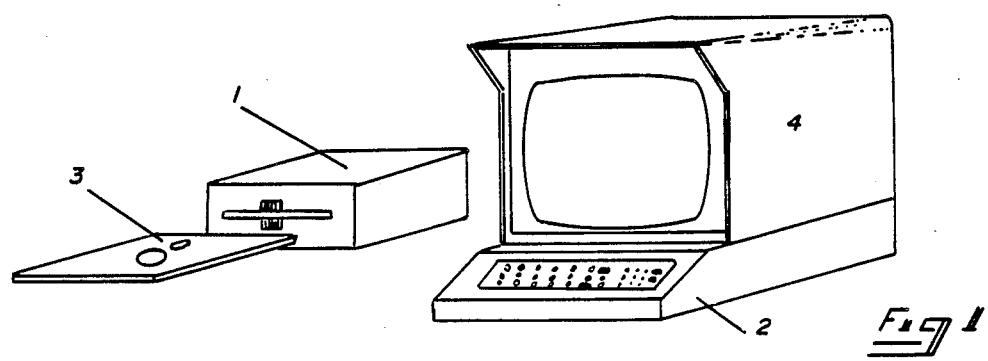
FIG. 1 is a schematic illustration of one arrangement within the scope of the present invention of the equipment utilized for submission of the answers and messages onto the diskette.

Briefly, FIG. 1 is an illustration of an arrangement which can be utilized by a student to submit messages and his answers to problem statements to his diskette in accordance with one procedure in accordance with the present invention.

FIG. 1 shows a computer terminal including a disk drive 1 and a microcomputer 2 and monitor 4. When the student diskette 3 is appropriately inserted in disk drive 1 it runs a program stored on it which prompts the student as described hereinafter, and the student uses the keyboard of computer 2 to enter his answers and messages for the instructor.

In one method in accordance with the present invention, parameter-selectable problem statements are selected by the instructor. These problems use parameters, for example A, B, C, D, E, and F, in place of some or all of the digits of the values used in the statement of the problem. For example a problem statement given to all students may read (3.A) (CB+8F.DE)=??

The student having the identification code 257104 must substitute the appropriate values in the solution of the problem statement, in this case A=2, B=5, C=7, D=1, E=0, and F=4. His correct required calculation would then be (3.2) (75+84.10)=(3.2) (159.10)=509.12. The instructor can set up the grading program so as to accept a lower level of accuracy, for example 509 as correct. If each student has a different identification code, each should have a different correct solution to the problem statement. Intermediate values, e.g. (CB+8F.DE)=?? in the example above, may be required as answers to help the student determine the source of any errors in the final answer.

Typically an instructor utilizing the present system uses a problem bank consisting of several hundred computer gradable parameter-selectable problem statements. The problem bank could be utilized to create examinations/quizzes or drill/practice sets as well as homework.

Figure 2:
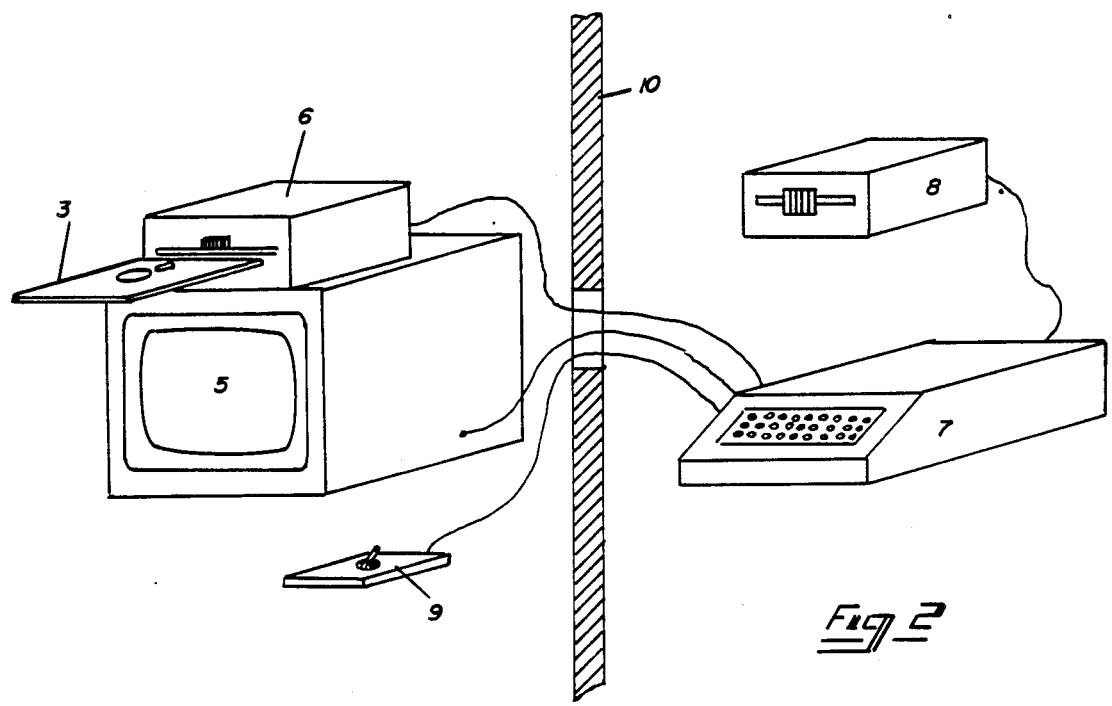
FIG. 2 is a schematic illustration of one arrangement within the scope of the present invention for the grading of answers submitted on diskettes.

In the case where homework grading is to be by microcomputer as shown in FIG. 2, a utility program provided on a system program diskette would be used to solve the assigned problem statements using the digits of the identification codes of all students in the course and then store these individual correct answer sets, perhaps encrypted, on files on the system data diskette as shown in FIG. 3 before any grading takes place. These correct answer sets are loaded into the memory of the computer doing the grading so that answers submitted by the students can be compared quickly to the appropriate correct answers as described hereinafter.

However, it will be understood that within the scope of the present invention is the possibility of using several grading disk drives simultaneously as well as the possibility that subroutines for correctly solving the problem statements can be loaded into the computer's memory with the grading program to solve for a student's correct answers in real time, that is, during grading after the student's identification code is read from his diskette, rather than previously stored in files as described in the preceding paragraph.

It should also be noted that in any case the student diskette carries the student's unique identification code for purposes of informing the computer as to the identity of the student submitting the work and also the parameter values used to get answers. Further, the identification code used for one course on the student diskette may differ from that used for another course on the same diskette.

In the case of a homework assignment, the instructor can set dates that the computer will be available to grade a particular assignment. Such an arrangement prevents procrastination by the student and forces the student to work the problems within prescribed time limits. The homework assignments are given to all students in the usual way; and, after replacing parameters by suitable identification code digits, the student works the problem statements and obtains answers apart from the computer terminal in the usual way, for example at a desk or other facility. Upon solution of some or all problems the student goes to any suitable computer 2 as illustrated in FIG. 1, and inserts his student diskette 3 in disk drive 1. When the Disk Operating System (DOS) is booted, the computer runs a program stored on the student's diskette which ascertains the course number, homework number, and (if not entered previously) the student's identification code for the course, and then prompts the student for messages and answers for that homework. The student uses the keyboard of computer 2 to enter the answers he wants graded along with any messages he may have for the instructor, and the submitted information is retained on the diskette. This is repeated for all homeworks for which the student has answers or messages. The diskette is now ready to be inserted in the grading disk drive for grading. Before doing so, however, the student may choose to re-use disk drive 1 to submit more answers and messages or to revise ones submitted earlier, in which case the prompts include reminders of answers and messages submitted previously.

One example of the answer entry process is shown below. In this instance, the homework assignment has three questions: Q1 having 3 parts, Q2 having 5 parts, and Q2 having 4 parts, for a total of 12 answers. Three answers, namely A1, A4 and A5, have already been graded as correct during a previous grading session. Two answers, A2 and A6 and a message have been submitted previously but have not yet been graded; they were not changed in this example, although the opportunity to do so is illustrated. Two new answers, A3 and A9, were submitted. For clarity, responses entered from the keyboard are underlined, and <RETURN> denotes hitting the RETURN key:

```
HI THERE HARD WORKING STUDENT.
PLEASE ENTER CLASS#, HOMEWORK#:
1012, 3<RETURN>
CONFIRM: CLASS# = 1012
        HOMEWORK# = 3
CORRECT? (Y OR N) Y<RETURN>
{Clear the screen, display the following through "A12 = ?",
then move the cursor to just after "A2 = 2.345?"}*
HIT <RETURN> TO SKIP AN ANSWER
         R    TO RE-ENTER AN ANSWER
    CL# 1012  N TO GO TO THE NEXT QUESTION
    HW# 3    F WHEN YOU ARE FINISHED
Q1  A1 = OK
    A2 = 2.345?<RETURN> IF OK, JUST HIT <RETURN>
    A3 = −223<RETURN> {cursor skips past A4, A5 to A6}*
Q2  A4 = OK
    A5 = OK
    A6 = 4 1/3?<RETURN> IF OK, JUST HIT <RETURN>
    A7 = N<RETURN> {cursor skips past A8 to A9}*
    A8 = ?
Q3  A9 = ?3.1E-5F<RETURN> {cursor skips past A10-A12}*
    A10 = ?
    A11 = ?
    A12 = ?
CURRENT MESSAGE FOR YOUR INSTRUCTOR: WHY IS
A7 = 2.6 WRONG?
DO YOU WISH TO 1. LEAVE, 2. DELETE, 3. ADD, OR
4. MODIFY IT:
1, 2, 3, OR 4? 1<RETURN>
       UPDATING DISK. PLEASE WAIT . . .
YOUR DISK HAS BEEN UPDATED.
DO YOU HAVE OTHER ANSWERS TO SUBMIT?
```

-continued

```
<Y OR N>? N<RETURN>
```
*Narrative Comments

After answers to be graded and messages are entered on his diskette, the student can go to a designated grading disk drive 6 for the particular course(s) in which the student is enrolled, as illustrated in FIG. 2. As previously noted, the computer 7 can be a microcomputer with the system data files stored on an auxiliary system data diskette in a system disk drive 8, as shown in FIG. 2, or on a mini- or mainframe with the system data files in the computer's static memory. In either case the computer 7 runs a program that reads and processes the responses on diskette 3.

If a microcomputer is used, the computer 7 including a keyboard and the system disk drive 8 containing the system data files are physically separated from the grading area. All the student sees in of the grading apparatus is the grading disk drive 6, and perhaps a "ready" switch 8 such as a push button or joy stick and/or an output device such as a monitor 9.

The student would normally insert his student diskette 3 into a grading disk drive 6 and then initiate the grading operation by means of switch 8. This causes the grading program to exchange any messages between the student and instructor, read the submitted answers, grade answers for homeworks that are neither too early nor too late for grading, and update both the student diskette and the system files in accordance with the results. The results can be displayed on an output device [e.g. a monitor 9 or printer (not shown)] as they become known; when no output device is provided, a visual or audible "grading finished" signal (not shown) is activated and the student can then go to a different computer (as in FIG. 1) to see the results and instructor's messages displayed. Once the results are known, the student can rework and resubmit answers that were not graded as correct. Revised answers can be submitted for grading as often as necessary during the gradable period for the assignment.

The homework grading process as presently envisioned is directed to two purposes. First, it minimizes the time that any one student spends at the common grading apparatus and thus ensures rapid throughput of students who want grading. Further, it allows the use of a physical or electronic barrier 10 to deny students any access to the system data files while grading is taking place and thus ensures the security of the system data files.

It will be recognized that a student can use the same diskette for several different courses, and that a single grading apparatus can be used to simultaneously grade homeworks in several courses for which there are submitted answers on the student diskettes. Moreover, the same microcomputer can, at different times, serve as both computer 2 of FIG. 1 and computer 7 of FIG. 2.

FIG. 3 illustrates one arrangement within the scope of the present invention for preparing and maintaining system data files. In FIG. 3, these files are prepared using a computer with keyboard and monitor 21 along with two disk drives 22, 23. A diskette containing system programs uses one disk drive, say drive 23, while a diskette containing system data files uses the other, say drive 22.

In FIG. 3, the grading program 33 is on the system program diskette along with several utility programs: utility program 32 for creating files 42 of encrypted correct answers and for setting up and maintaining the homework data (problems, point values and dates) on the course information files 41; utility program 34 for maintaining files 43 and 44 of messages respectively for and from the instructor(s); and utility program 35 for maintaining files 45 of encrypted student performance data and the student data (names and identification codes) on the course information files 41. Also on the system program diskette are two programs that can provide useful printed information for the instructor: The first is a homework/test generator 31 that can print out selected problem statements 61 either in terms of symbolic parameters or with specified numbers substituted for the parameters and, if desired, correct answers 62 to these problems with appropriate numbers substituted for the parameters. The second is a report generator 36 that can output reports 63 of selected students' performance to date on specified homeworks. In addition (not shown) there may be similar utilities and files relating to tests/quizzes and drill practice sets. In FIG. 3, the shapes and locations of boxes in the schematics of the system data diskette are for convenient placement of arrows and have no actual significance.

The solid arrows in FIG. 3 indicate the flow of data in creating and maintaining the homework related files on the system data diskette. Although not shown, input to all programs on the system program diskette may also come from the instructor at the keyboard of computer 21. In particular, if no electronic means for providing the day's date is available the instructor can provide it to the grader program when it is first executed so that the program can determine which homeworks should be graded for that day.

The procedure indicated on FIG. 3 for creating a homework is as follows: The homework utility 32 first prompts the instructor for the course number and gets the current homework and student data from the appropriate course information file 41. It then prompts for descriptions of the problem statements and the desired point values and grading dates, updates file 41 accordingly, and asks the instructor to remove the system program diskette from drive 23 and replace it with course diskette 52 which then provides the programs necessary to get the correct answers for the homework in accordance with the identification codes of all students in the course. Once obtained, these answers are suitably encrypted and written to the appropriate answer file 42, and the instructor is asked to return the system program diskette to drive 23 and given an opportunity to use the homework/test generator 31 to print the homework assignment 61 (which can be a single sheet involving parameters or individualized sheets with students' names and parameter values already filled in) and/or provide a list of all correct answers 62 for the instructor.

The grader program 33 updates the student's encrypted performance record in file 45 and appends his messages to file 43 while grading his diskette.

The dashed arrow from utility 35 to utility 32 indicates the fact that when the student file utility 35 is used either to add a new student or to modify the identification code of an existing student in a course file 41, the answer files 42 for the course must be updated as described in the preceding paragraph.

Course diskette 51 contains the text of the problem statements with special non-printing control characters inserted near the parameters to allow the parameters to be replaced by particular values when printed as a homework, test, or drill/practice set as specified by the homework/test generator program 31 or homework utility 32. Course diskette 52 computes correct answers to selected problem statements using specified parameter values; in FIG. 3, it is called by the homework utility 32 to help prepare file 42 of encrypted correct answers. Although not shown, it is also used in getting answers 62 to test/quizzes and drill/practice sets.

The general information flow description for submitting one homework's answers and then getting them graded is shown, with comments, in FIG. 4. The information from the student is differentiated from the results of grading by coded arrows.

Where answers are submitted or updated, the student diskette 3, as previously described, is inserted in disk drive 1 of computer 2. It should be noted that initially the student has been given the problem statement and has obtained his answers by calculation away from the facility. A program on the student diskette 3 is loaded from the disk drive into the memory of the computer 2. Monitor 4 prompts for responses by the student 5 using the keyboard of computer 2.

In response to the prompts, the student enters his answers and messages to the instructor as previously described. The answers and messages are displayed on monitor 4 and stored on the diskette 3. When complete, the diskette 3 is withdrawn from disk drive 1.

In the grading process shown in FIG. 4, diskette 3 is inserted in a grading disk drive 6 connected through barrier 10 to computer 7 which operates the system disk drive 8. In the arrangement shown, disk drive 8 is initially used to load the grader program from the system program diskette (not shown) into computer 7 and the current date is provided. The system program diskette is then removed and replaced by the system data diskette 16 for grading. However, other suitable procedures for preparing the grader program can be used.

When the student inserts his diskette 3 in disk drive 6, computer 7 reads the course number, homework number, identification code, and the submitted answers and messages from the diskette, checks the student identification code (against file 41) and the date (to see if the answers are submitted within the period prescribed on file 41) and, if they are acceptable, grades the answers using the information on file 42 of the system data diskette 16.

Problems that were answered correctly are noted on both the system data diskette 16 in drive 8 and the student diskette 3 in drive 6. The results may also be displayed on monitor 9. The student then removes his diskette and can rework those problems that were incorrectly answered.

It will be understood that the foregoing is but one arrangement within the scope of the present invention and that other systems also within the scope of the present invention will occur to those skilled in the art upon reading the disclosure.

The invention claimed is:

1. A system for grading answers to a set of problem statements submitted to a group of students, each problem statement including selectable alphanumeric parameters, each parameter representing a number to be selected from one of a plurality of unique identification codes, each code comprising a plurality of numerals in a predetermined order, including;
   a. a transportable preprogrammed student memory means which requests and stores a unique identification code as well as information from the student comprising answers to problem statements;
   b. grading means, including receptacle means to read student memory means in order to receive said unique identification code, determine the correct answers in accordance with said unique identification code and use the correct answers to grade the submitted answers, store the results on one or more electronic memory means, and report results;
   c. grading apparatus, wherein said receptacle means receives said student memory device, reads said identification code and answer information from said student memory device, determines the correct answers in accordance with said unique identification code, and uses said correct answers to grade the submitted answers.

2. The invention of claim 1 wherein said identification code assigned to each student is different than the identification code assigned to any other student, hence results in answers unique to that student.

3. The invention of claim 1 wherein said problems submitted to said students are selected from a larger set of problem statements stored in a manner which allows problem statements to be displayed either in terms of selectable parameters or with specific selected values.

4. The invention of claim 1 including display means to receive said student memory means and to display said requests for information from said student.

5. The invention of claim 4 wherein said display means includes information input means to receive responses from said student to said requests for information and record said responses on said student memory means.

6. The invention of claim 4 wherein messages to said student can be recorded on said student memory device and displayed on said display means.

7. The invention of claim 1 wherein said student memory means includes means to request messages from said student, display said requests for messages from said student and record said messages on said student memory means.

8. The invention of claim 1 wherein said grading apparatus includes system memory means to store answers to said problem statements for sets of identification codes and to record results of comparison of answers stored in said system memory means with said student memory device in said system memory means and on said student memory device.

9. The invention of claim 8 wherein said grading apparatus includes receptacle means to receive said student memory device and transmit information stored on said student memory device to said grading apparatus system memory means wherein said receptacle means and said grading apparatus system memory means are separated by barrier means and said system memory means is inaccessible to said student.

10. The invention of claim 8 wherein said grading apparatus includes calendar means, said problem statements include time periods during which answers are to be submitted and said grading apparatus includes means to verify that response to problem statements are submitted within the permissible time period.

11. The invention of claim 8 wherein said grading apparatus is adapted to receive answers to problem statements according to identification codes and hold same in said system memory means for comparison with answers submitted from said student memory device.

12. The invention of claim 1 wherein said grading apparatus determines answers to said problem statements upon receipt of a unique identification code.

* * * * *